(12) United States Patent
Lee

(10) Patent No.: US 7,283,323 B2
(45) Date of Patent: Oct. 16, 2007

(54) DAMPING STRUCTURE OF A HARD DISK DRIVE

(75) Inventor: Jae-suk Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 512 days.

(21) Appl. No.: 10/986,024

(22) Filed: Nov. 12, 2004

(65) Prior Publication Data

US 2005/0180044 A1    Aug. 18, 2005

(30) Foreign Application Priority Data

Feb. 1, 2004    (KR) ...................... 10-2004-0009833

(51) Int. Cl.
*G11B 17/00*    (2006.01)
(52) U.S. Cl. ................................. 360/97.01
(58) Field of Classification Search ............. 360/97.01, 360/97.02

See application file for complete search history.

(56) References Cited

U.S. PATENT DOCUMENTS 6,175,469 B1 *   1/2001   Ahmad et al. ........... 360/97.02
6,469,864 B2 *   10/2002   Kamezawa et al. ...... 360/97.01
6,498,700 B2 *   12/2002   Takahashi et al. ....... 360/97.01

FOREIGN PATENT DOCUMENTS

| JP | 11-232862 | 8/1999 |
| JP | 11-328946 | 11/1999 |
| JP | 2002-157858 | 5/2002 |

* cited by examiner

*Primary Examiner*—Angel Castro
(74) *Attorney, Agent, or Firm*—Staas & Halsey LLP

(57) ABSTRACT

A damping structure of a hard disk drive. The damping structure includes: a damping plate arranged spaced apart from an upper surface of the cover member, such that an air gap is formed between the cover member and the damping plate; and a damping member arranged between an edge of the cover member and an edge of the damping plate. The damping plate includes a stepped portion which is inwardly formed at a portion spaced apart from the edge of the damping plate by a predetermined distance, and a bent portion which is formed at an edge of the damping plate and smoothly bent toward the cover member. In such a damping structure, an impact that is applied to the cover member from an outside can be reduced much more through the damping plate and the damping member.

24 Claims, 5 Drawing Sheets

DAMPING STRUCTURE OF A HARD DISK DRIVE

CROSS-REFERENCE TO RELATED APPLICATION

This application claims the priority of Korean Patent Application No. 2004-9833, filed on Feb. 14, 2004, in the Korean Intellectual Property Office, the disclosure of which is incorporated herein in its entirety by reference.

BACKGROUND OF THE INVENTION

1. Field of the Invention

The present invention relates to a hard disk drive, and, more particularly, to a damping structure of a hard disk drive which is provided at a cover member to dampen an impact.

2. Description of the Related Art

As one of several possible information storage devices of a computer, a hard disk drive (HDD) is a device that is designed to reproduce/record data from/on a disk using a read/write head. In such a hard disk drive, the head moves to a desired position while flying above a recording surface of a rotating disk via an actuator and performs the reproducing/recording operations.

FIG. 1 is an exploded perspective view of a conventional hard disk drive, and FIG. 2 is a cross-sectional view of the hard disk drive shown in FIG. 1.

Referring to FIGS. 1 and 2, a hard disk drive includes a base member 11 and a cover member 12, a spindle motor 30 mounted on the base member 11, one or more data storage disks 20 installed in the spindle motor 30, and an actuator 40 to move a read/write head to a predetermined position of the disk 20.

The spindle motor 30 is supported by a flange 31, which is fixed to the base member 11. A bearing 37 is provided on an outer periphery of a shaft 32 of the spindle motor 30, allowing a hub 33 to rotate. The disk 20 is fitted into an outer periphery of the hub 33. Where a plurality of disks 20 are mounted into the outer periphery of the hub, a ring-shaped spacer 34 is installed on an outer periphery of the hub 33 in order to maintain gaps between the disks 20. A clamp 35 is coupled to an upper portion of the hub 33 in order to prevent the disks 20 from being released.

The actuator 40 includes a swing arm 44 that is pivotally mounted on a pivot 42 that is installed in the base member 11, a suspension 46 installed in one end portion of the swing arm 44 to elastically bias a slider 48 toward a surface of the disk 20, in which the head is mounted on the slider 48, and a voice coil motor (VCM) 50 to rotate the swing arm 44. The voice coil motor 50 is controlled by a servo control system. The voice coil motor 50 rotates the swing arm 44 in a direction based on Fleming's left hand rule by an interaction between current inputted to a VCM coil and magnetic field induced by a magnet. In other words, if the hard disk drive is powered on and the disk 20 starts to rotate, the voice coil motor 50 rotates the swing arm 44 such that the slider 48 on which the read/write head is mounted is moved over a recording surface of the disk 20. On the other hand, if the hard disk drive is powered off and the disk 20 is stopped, the voice coil motor 50 rotates the swing arm 44 such that the head escape from the disk 20.

The cover member 12 is assembled on an upper portion of the base member 11 through a plurality of coupling screws 18. A gasket 19 is interposed between the base member 11 and the cover member 12 in order to prevent dust or moisture from being introduced into the hard disk drive. The gasket 19 is generally formed of viscoelastic material, such as rubber, and attenuates vibration of the hard disk drive.

Screw insertion holes 14 and 15 are formed at the cover member 12, such that a shaft fixing screw 16 and a pivot fixing screw 17 may be respectively inserted thereinto. The shaft fixing screw 16 is coupled to the shaft 32 of the spindle motor 30 and the pivot fixing screw 17 is coupled to the pivot 42 of the actuator 40. The cover member 12 is generally formed of aluminium alloy using a die casting process to form the aluminium alloy. A thin stainless damping plate 60 is attached to the upper surface of the cover member 12 using a double-sided adhesive tape 61 in order to reduce noise of the hard disk drive.

According to the related art, a protrusion part 13 is formed along an edge of the cover member 12 in order to prevent scratches or other damage from occurring on a surface of the damping plate 60 during the assembling process of the hard disk drive. The protrusion part 13 is designed to extend higher than the upper surface of the damping plate 60 by a height "C".

However, in the conventional hard disk drive constructed as above, a main object of the damping plate 60 is to reduce noise, unfortunately having a result in which an impact from an outside is not damped sufficiently. In more detail, if the hard disk drive falls down on a table while inclining toward the cover member 12, the protrusion part 13 of the cover member 12 collides with the table first of all. At this point, impact energy applied to the protrusion part 13 is directly transferred to the hard disk drive. Specifically, the impact energy is transferred to the spindle motor 30 through the cover member 12 and the shaft fixing screw 16, so that the bearing 37 of the spindle motor 30 may be damaged and the disk 20 is vibrated. Also, the impact energy is transferred to the slider 48 of the actuator 40 through the cover member 12 and the pivot fixing screw 17, and then, to the slider 48 through the actuator 40 installed in the base member 11. The transferred impact energy causes the slider 48 to be vibrated, such that the head mounted on the slider 48 collides with the surface of the disk 20. This phenomenon is called a head slap. The head slap damages the head and the recording surface of the disk 20, resulting in erroneous read/write operations of the hard disk drive.

Japanese Patent Laid-Open Publication No. 11-328946 discloses a damping plate, which is arranged spaced apart from an upper surface of a cover member by a predetermined interval. An object of this damping plate is to reduce noise. Since the damping plate is formed in a perfect flat shape, its damping characteristic is not satisfactory. Also, the damping plate is attached to the upper surface of the cover member using a double-sided tape. However, the double-sided tape is very thin, about 0.15 mm in thickness, such that impact absorption efficiency is low.

SUMMARY OF THE INVENTION

The present invention provides a damping structure of a hard disk drive, which is capable of effectively reducing an impact that is applied from an outside to a cover member.

According to an aspect of the present invention, a damping structure of a hard disk drive comprises a base member and a cover member that enclose and protect a spindle motor to rotate a data storage disk and an actuator to move a read/write head to a predetermined position of the data storage disk, in which the damping structure comprises: a damping plate arranged so as to be spaced apart from an upper surface of the cover member, such that an air gap is formed between the cover member and the damping plate;

and a damping member arranged between an edge of the cover member and an edge of the damping plate, wherein the damping plate includes: a stepped portion which is inwardly formed at a portion that is spaced apart from the edge of the damping plate by a predetermined distance; and a bent portion which is formed at an edge of the damping plate and smoothly bent toward the cover member.

According to additional aspects of the invention, a stepped surface may be formed at the edge portion of the cover member and is lower than a central upper surface of the cover member, and the damping member may be arranged on the stepped surface. Top and bottom surfaces of the damping member may be respectively attached to the damping plate and the cover member using a double-sided adhesive tape. The damping member may be formed of viscoelastic material and may be at least 0.5 mm thick. The stepped portion may be formed in an inclined shape to be gradually lowered toward the edge of the damping plate. A fillet radius of the stepped portion may be at least 1 mm. A vertical bending amount of the bent portion may range from 0.1 mm to 0.2 mm. The damping plate may be formed of an elastic metal plate. In this case, the damping plate may be formed through a press process of a stainless steel plate.

According to still another aspect of the present invention, an impact that is applied to the cover member from an outside may be reduced much more through the damping plate and the damping member.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
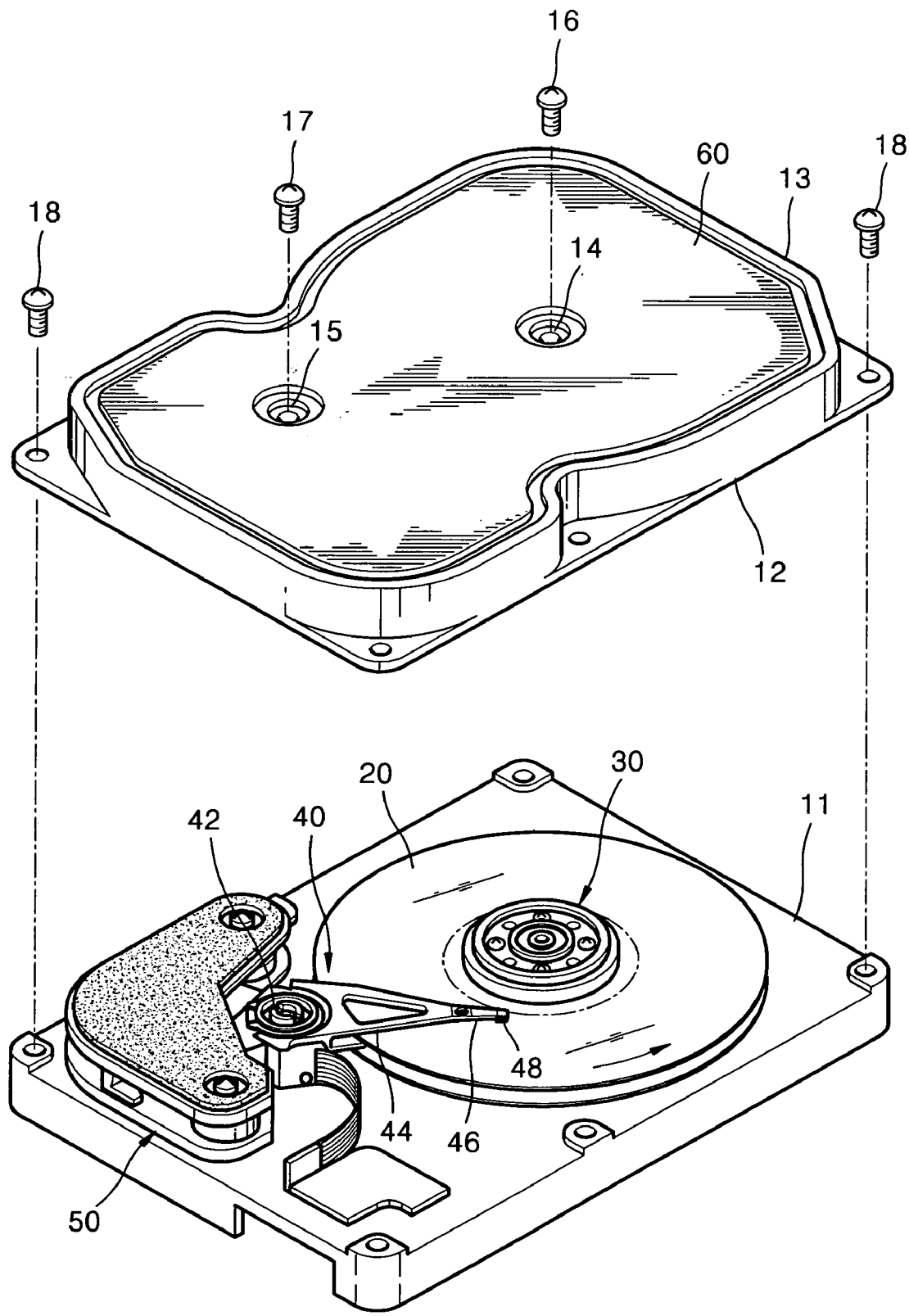
FIG. 1 is an exploded perspective view of a conventional hard disk drive.
Figure 2:
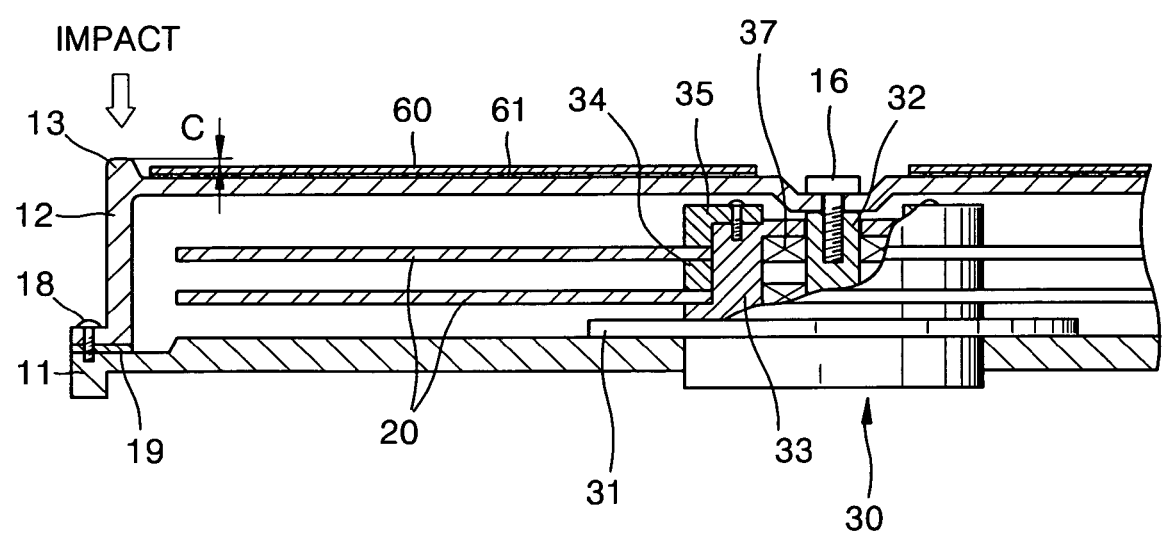
FIG. 2 is a cross-sectional view of the hard disk drive shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
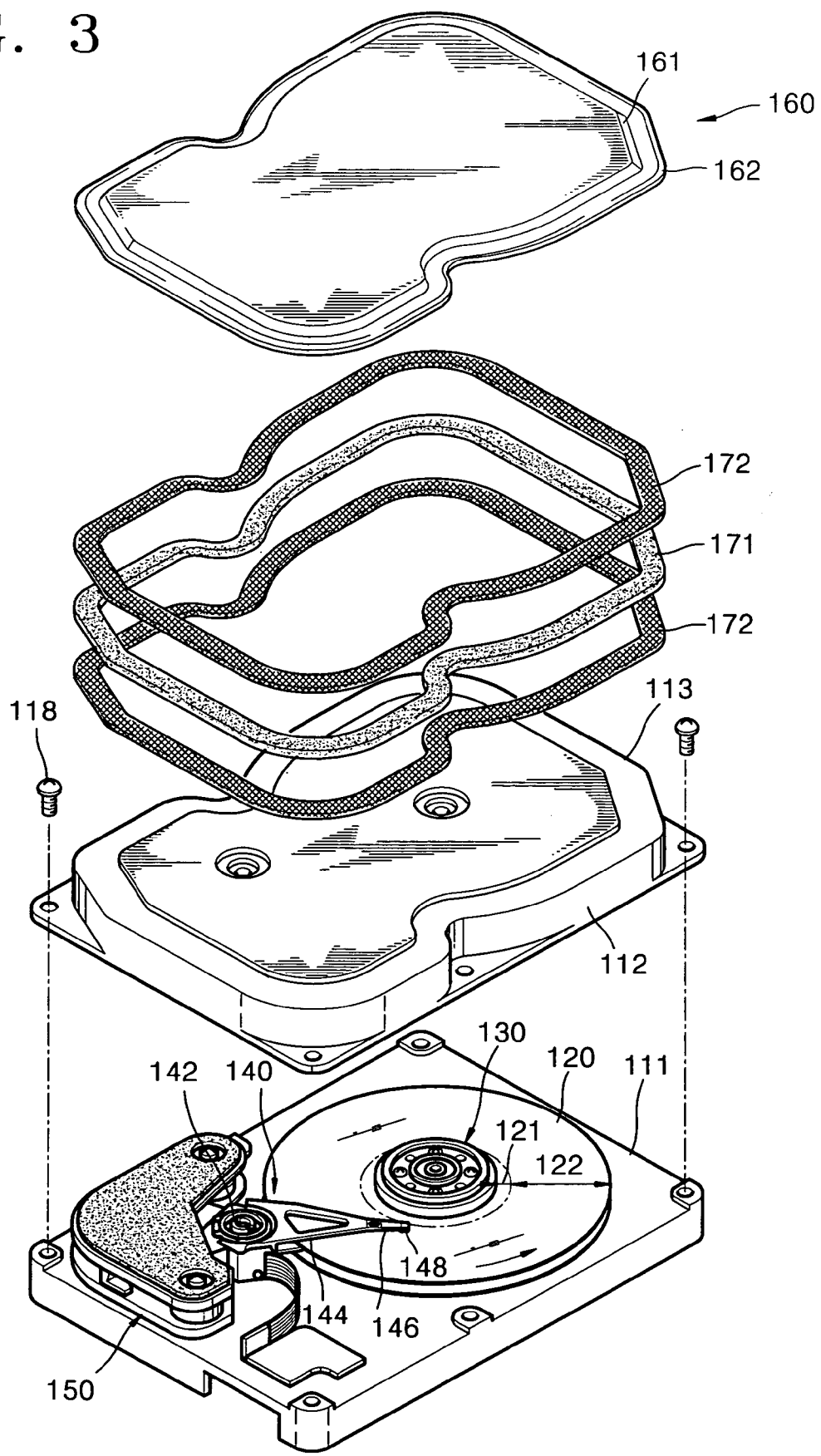
FIG. 3 is an exploded perspective view of a hard disk drive adopting a damping structure according to an embodiment of the present invention.
Figure 4:
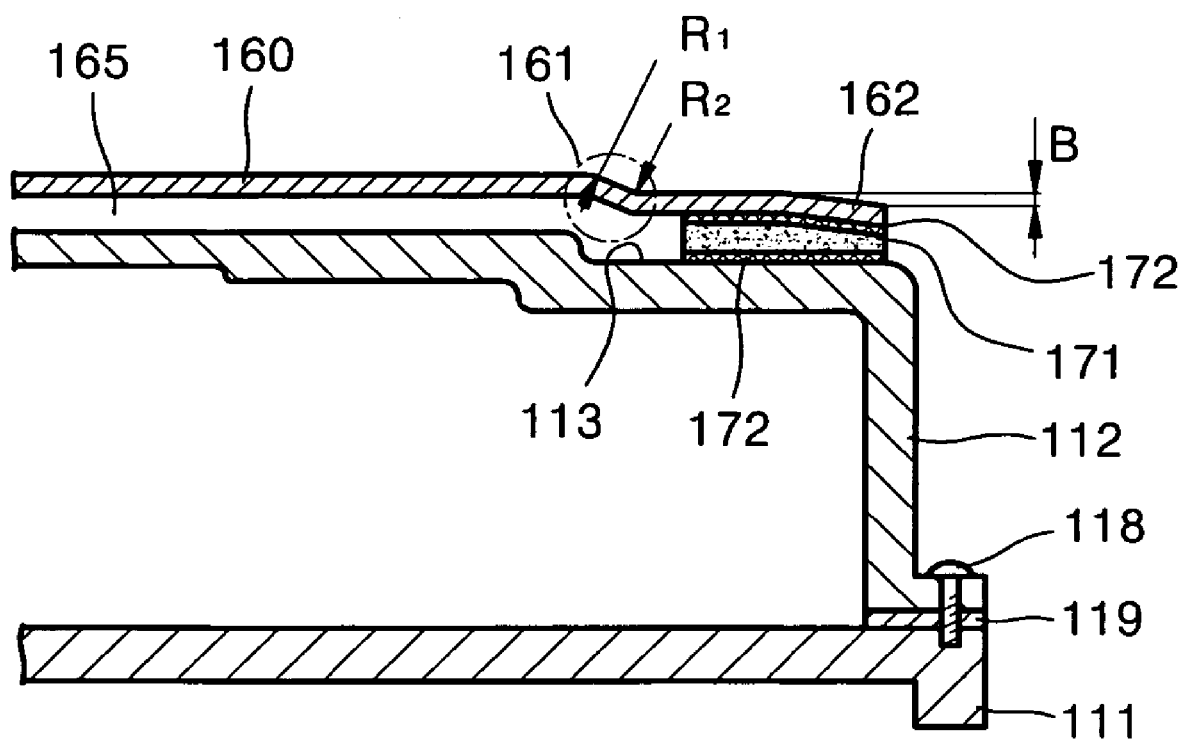
FIG. 4 is a partial cross-sectional view of the damping structure shown in FIG. 3.

FIG. 3 is an exploded perspective view of a hard disk drive adopting a damping structure according to an embodiment of the present invention, and FIG. 4 is a partial cross-sectional view of the damping structure shown in FIG. 3.

Referring to FIGS. 3 and 4, a hard disk drive includes a data storage disk 120, a spindle motor 130 to rotate the disk 120, and an actuator 140 to move a read/write head to a predetermined position of the disk 120. The disk 120, the spindle motor 130 and the actuator 140 are enclosed and protected by a base member 111 and a cover member 112.

The disk 120 is a data recording medium and one or more disks are mounted on the spindle motor 130 and rotated by the spindle motor 130. A parking zone 121 is provided on an inner periphery of the disk 120. A data zone 122 is provided on an outer periphery of the disk 120. The parking zone 121 is a portion where the head is parked when the hard disk drive stops, and the data zone 122 is a portion where data is recorded.

The actuator 140 moves the read/write head to a predetermined position of the disk 120 in order to reproduce/record data from/on the disk 120. The actuator 140 is rotatably installed on the base member 111. Specifically, the actuator 140 includes a swing arm 144 pivotally mounted on a pivot 142 that is installed in the base member 111, a suspension 146 installed in one end portion of the swing arm 144 to elastically bias the slider 148 toward a surface of the disk 120, in which the head is mounted on the slider 148, and a voice coil motor (VCM) 150 to rotate the swing arm 144.

The voice coil motor 150 is controlled by a servo control system. The voice coil motor 150 rotates the swing arm 144 in a direction based on Fleming's left hand rule by an interaction between current inputted to a VCM coil and magnetic field induced by a magnet. In other words, if the hard disk drive is powered on and the disk 120 starts to rotate, the voice coil motor 150 rotates the swing arm 144 in a clockwise direction, such that the slider 148 on which the read/write head is mounted are moved from the parking zone 121 over the data zone 122 of the disk 120. The slider 148 lifts up from a surface of the disk 120 to a predetermined height by a lift force, which occurs due to the rotating disk 120. In this state, the head, mounted on the slider 148, performs the operations of reproducing/recording data from/on the recording surface of the disk 120. On the other hand, if the hard disk drive is powered off and the disk 120 is stopped, the voice coil motor 150 rotates the swing arm 144 in a counterclockwise direction, such that the slider 148 is parked on the parking zone 121 of the disk 120.

The head parking system includes a contact start stop (CSS) system and a ramp loading system. In order to secure wider data storage space, the ramp loading system has a ramp (not shown) installed outside of the disk 120, instead of providing the parking zone 121 at an inner periphery of the disk 120, such that the head is parked on the ramp. The present invention may be applied to the hard disk drive adopting the head parking system of the ramp loading system as well as the CSS system.

The base member 111 and the cover member 112 are coupled with each other through a plurality of coupling screws 118. A gasket 119 is interposed between the base member 111 and the cover member 112 in order to prevent dust or moisture from being introduced into the hard disk drive. The gasket 119 is generally formed of viscoelastic material, such as rubber, and attenuates vibration of the hard disk drive.

In the hard disk drive constructed as above, the damping structure of the present invention is provided at the cover member 112 and attenuates an impact applied from an outside to the cover member 112.

The damping structure according to an embodiment of the present invention includes a damping plate 160 provided above the cover member 112 and a damping member 171 provided between the cover member 112 and the damping plate 160. Also, the damping plate 160 includes a stepped portion 161 and a bent portion 162.

The cover member 112 is generally formed of aluminium alloy using a die casting process to form the aluminium alloy. The damping plate 160 is arranged so as to be spaced apart from an upper surface of the cover member 112 by a predetermined interval. Thus, an air gap 165 is formed between the damping plate 160 and the cover member 112. The air gap 165 reduces noise occurring in an inside of the hard disk drive and operates as an air damper that absorbs an impact energy applied to the damping plate 160.

The damping plate 160 dampens an impact applied from an outside by a spring operation. The damping plate 160 is formed of an elastic metal plate. For example, the damping plate 160 may be manufactured by pressing a stainless steel plate of approximately 0.5 mm thick to have a shape corresponding to an upper surface of the cover member 112.

The stepped portion 161 is formed on a portion spaced apart from an edge of the damping plate 160 by a predetermined distance. The stepped portion 161 improves a spring characteristic of the damping plate 160, to enhance a damping efficiency. An operational effect of the stepped portion 161 will be described later with reference to an impact test result.

Specifically, the stepped portion 161 may be formed in such a shape that the stepped portion 161 is gradually inclined toward the edge of the damping plate 160. This results in the appearance of fillet radii $R_1$ and $R_2$. The fillet radius $R_1$ refers to the radius of the curve generated at the upper surface of the damping plate where the stepped portion is formed. Similarly, the fillet radius $R_2$ refers to the radius of the curve generated at the upper surface of the damping plate where the stepped portion ends. If fillet radii $R_1$ and $R_2$ of the stepped portion 161 are too small, an improvement of a spring characteristic of the stepped portion 161 is not sufficient. Therefore, in an embodiment of the invention the radii $R_1$ and $R_2$ of the stepped portion 161 are at least 1 mm. According to another embodiment of the present invention, the fillet radius $R_1$ of the stepped portion 161 is approximately 1.85 mm and the fillet radius $R_2$ is approximately 1.25 mm.

The bent portion 162 is formed at the edge of the damping plate 160 and improves a spring characteristic of the damping plate 160 in combination with the stepped portion 161, so that the bent portion enhances a damping efficiency of the stepped portion and vice versa. An operational effect of the bent portion 162 will be described later with reference to an impact test result.

Specifically, the bent portion 162 is formed by smoothly bending the edge of the damping plate 160 toward the cover member 112. In an embodiment of the invention, a vertical bending amount B of the bent portion 162 ranges from approximately 0.1 mm to approximately 0.2 mm.

The stepped portion 161 and the bent portion 162 may be formed at the damping plate 160 through various methods. In an embodiment of the invention, the stepped portion 161 and the bent portion 162 may be formed together during a pressing process of a metal plate to be used as the damping plate 160, for example, a stainless steel plate. In detail, the stepped portion 161 and the bent portion 162 may be formed by pressing a stainless steel plate using a press die, which is formed in a shape corresponding to the stepped portion 161 and the bent portion 162. On the other hand, the bent portion 162 may be formed by a different method. When the stainless steel plate is pressed in a state that a soft plate is arranged at a bottom surface of an edge of the stainless steel plate, the bent portion 162 can be formed while bending the edge of the stainless steel plate downward due to a force applied thereto. At this point, adjusting a thickness of the soft plate may control a vertical bending amount B of the bent portion 162.

The damping member 171 is arranged between the edge of the cover member 112 and the edge of the damping plate 160. Top and bottom surfaces of the damping member 171 may be attached to the damping plate 160 and the cover member 112 using double-sided adhesive tapes 172, respectively.

The damping member 171 absorbs and reduces impact energy, which is transferred from the damping plate 160 to the cover member 112. To this end, the damping member 171 may be formed of viscoelastic material, such as rubber or polymer. Therefore, as the damping member 171 is made thicker, the damping characteristics of the damping member may increase. Particularly, in an embodiment of the invention, the thickness of the damping member 171 is at least 0.5 mm. However, if the damping member 171 is too thick, a whole height of the hard disk drive becomes high, such that a height limit of the hard disk drive is deviated. As a way to prevent such an event, in an embodiment of the invention, the thickness of the damping member 171 is limited to approximately 1 mm or less.

Also, forming an embodiment of the invention, a stepped surface 113 that is lower than a central upper surface of the cover member 112 is formed at the edge portion of the cover member 112. In this case, the damping member 171 is arranged on the stepped surface 113 of the cover member 112. Therefore, using a sufficiently thick damping member 171 is possible even within the range of the height limits of the hard disk drive.

In another embodiment of the invention, a range of the thickness of the damping member 171 is from 0.6 mm to 0.7 mm thick, and the double-sided adhesive tapes 172 attached to the top and bottom surfaces of the damping member 171 are approximately 0.15 mm thick.

An operation of the damping structure according to an embodiment of the present invention will now be described.

If the hard disk drive having the above-described damping structure is inclined toward the cover member 112 and falls down on a table, an impact is applied to the damping plate 160. Accordingly, the damping plate 160 is primarily deformed elastically and an impact energy is absorbed and damped due to the spring operation. As is described above, since the stepped portion 161 and the bent portion 162 are provided at the damping plate 160, the damping efficiency of the damping plate 160 is enhanced. Then, the damping member 171 secondarily absorbs the impact energy that is transferred from the damping plate 160 to the cover member 112. Thus, the impact energy that is finally transferred to the inside of the hard disk drive is remarkably reduced compared with the initial impact energy.

An impact test result of the hard disk drive having the damping structure of the present invention will now be described.

Figure 5:
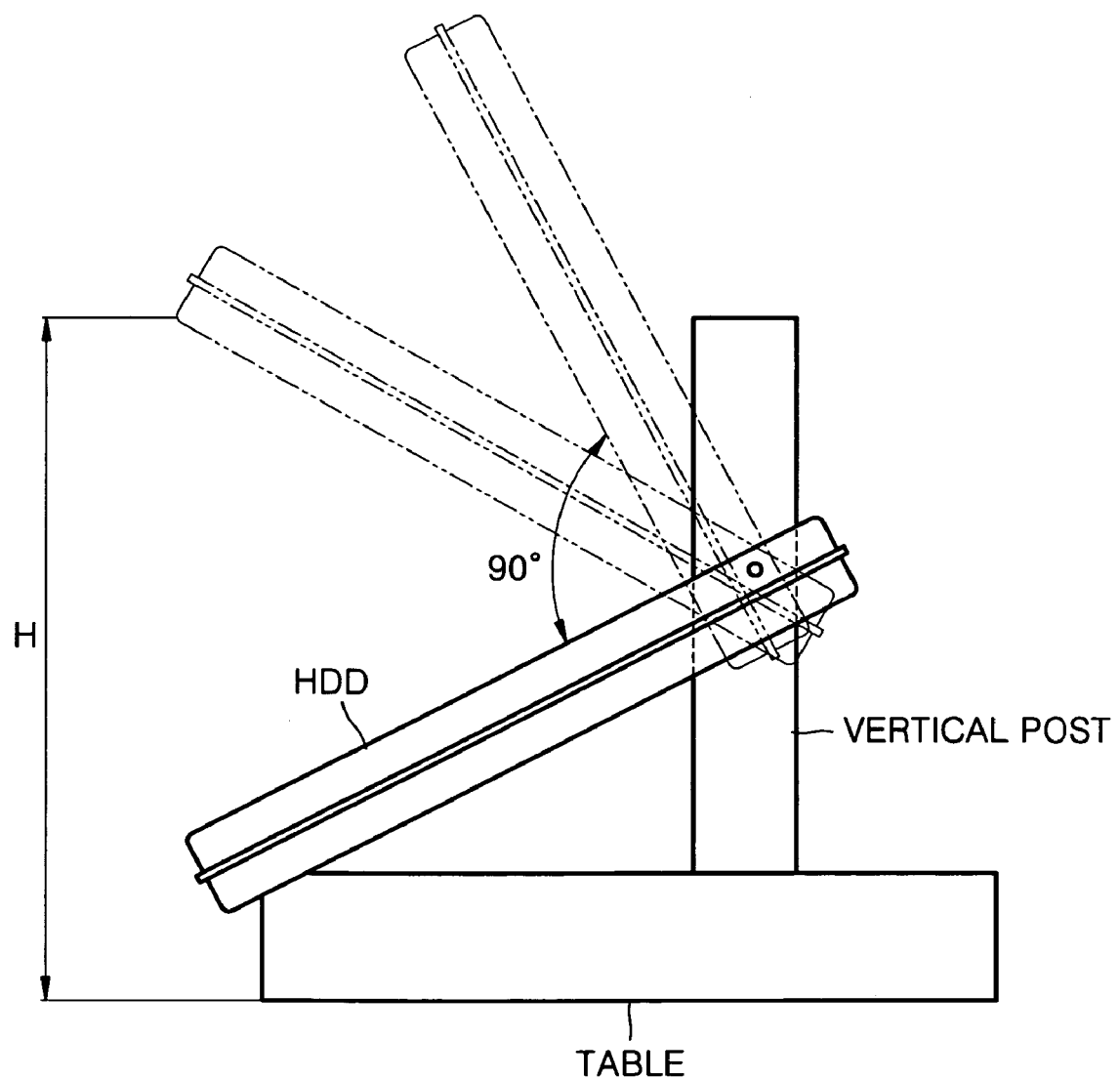
FIG. 5 is a schematic view of an impact test apparatus for the hard disk drive.

FIG. 5 is a schematic view of an impact test apparatus for hard disk drive. An impact test apparatus shown in FIG. 5 is a tilt drop test apparatus. Referring to FIG. 5, one end of the hard disk drive is pivotally coupled to a vertical post and the other end of the hard disk drive is dropped down at a predetermined height H. When the cover member of the hard disk drive collides with an edge of a table, the tilt drop test apparatus measures an impulse that is transferred to the inside of the hard disk drive.

Table 1, below, shows an impact test result, in which the impact test apparatus performs an impact test with respect to two samples while varying a test height H. Here, a sample 1 is a hard disk drive including a damping plate and a damping member, in which the damping plate has only a stepped portion. In other words, the damping plate is formed without forming a bent portion. A sample 2 is a hard disk drive including a damping plate and a damping member, in which the damping plate has both a stepped portion and a bent portion, as shown in FIG. 4.

TABLE 1

| Test height (H) | | 3 inch | 4 inch | 5 inch | 90° |
|---|---|---|---|---|---|
| Impulse | Sample 1 | 454 G | 598 G | 686 G | 712 G |
| | Sample 2 | 317 G | 407 G | 497 G | 533 G |

One may observe, from the impact test result of the sample 1, that the impulse transferred to the inside of the hard disk drive ranges from 454G to 712G depending on the test height H. Compared with the conventional hard disk drive of FIG. 1, in which the impulse ranges from 600G to 1000G, the impulse of the sample 1 is reduced by approximately 30%.

Also, one may observe, from the impact test result of the sample 2, that the impulse transferred to the inside of the hard disk drive ranges from 317G to 533G depending on the test height H. These results indicate that the impulse of the sample 2 is lower than that of the sample 1 as well as the conventional hard disk drive.

As a result, according to the damping structure of the present invention, in which both the stepped portion and the bent portion are formed at the damping plate and the relatively thick damping member is provided between the damping plate and the cover member, the damping efficiency is enhanced compared with the prior art.

As is described above, the damping characteristic due to the spring operation of the damping plate is improved by forming the stepped portion and the bent portion at the damping plate so that the air gap may be formed between the cover member and the damping plate. Also, compared with the related art, the impact energy absorption efficiency is increased due to the relatively thick viscoelastic damping member, which is interposed between the cover member and the damping plate. Accordingly, an impact applied to the cover member may be reduced more efficiently, so as to prevent the head slap phenomenon caused by the external impact.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A damping structure of a hard disk drive, including a base member and a cover member that enclose and protect a spindle motor to rotate a data storage disk and an actuator to move a read/write head to a predetermined position of the data storage disk, the damping structure comprising:

a damping plate that is spaced apart from an upper surface of the cover member, such that an air gap is formed between the cover member and the damping plate; and a damping member arranged between an edge of the cover member and an edge of the damping plate, wherein the damping plate comprises:

a stepped portion which is inwardly spaced apart from the edge of the damping plate by a predetermined distance, and a bent portion which is formed at an edge of the damping plate and smoothly bent toward the cover member.

2. The damping structure of claim 1, wherein a stepped surface, formed at an edge portion of the cover member, is lower than a central upper surface of the cover member, and the damping member is arranged on the stepped surface.

3. The damping structure of claim 1, wherein top and bottom surfaces of the damping member are respectively attached to the damping plate and the cover member using a double-sided adhesive tape.

4. The damping structure of claim 1, wherein the damping member is formed of viscoelastic material.

5. The damping structure of claim 1, wherein the damping member is at least approximately 0.5 mm thick.

6. The damping structure of claim 1, wherein the stepped portion is formed in an inclined shape to be gradually lowered toward the edge of the damping plate.

7. The damping structure of claim 1, wherein a fillet radius of the stepped portion is at least approximately 1 mm.

8. The damping structure of claim 1, wherein a vertical bending amount of the bent portion ranges from approximately 0.1 mm to 0.2 mm.

9. The damping structure of claim 1, wherein the damping plate is formed of an elastic metal plate.

10. The damping structure of claim 9, wherein the damping plate is formed through a press process of a stainless steel plate.

11. The damping structure of claim 9, wherein the bent portion is formed through a pressing process of the metal plate in which a soft plate is arranged at a bottom of an edge of the metal plate.

12. The damping structure of claim 9, wherein the bent portion is formed through a pressing process of the metal plate using a press die, the press die being formed in a shape corresponding to the bent portion.

13. A damper of a hard disk drive, including a base member and a cover member, having an edge and an upper surface, that enclose and protect a spindle motor and an actuator, the damper comprising:

a damping plate, spaced apart from the upper surface of the cover member, such that an air gap is formed between the cover member and the damping plate, the damping plate including:

a bent portion, which is bent toward the cover member, at an edge of the damping plate, and a stepped portion which is inwardly spaced from the edge of the damping plate; and a damping member arranged between the edge of the cover member and the edge of the damping plate.

14. The damper according to claim 13, wherein the air gap reduces noise occurring in an inside of the hard disk drive.

15. The damper according to claim 13, wherein the air gap reduces operates as an air damper that absorbs impact energy applied to the damping plate.

16. The damper according to claim 13, wherein the damping plate dampens an impact from an outside of the hard disk drive by a springing operation.

17. The damper according to claim 13, wherein the stepped portion is gradually inclined toward the edge of the damping plate.

18. The damper according to claim 17, wherein fillet radii $R_1$ and $R_2$ are generated at an upper surface of the damping plate where the stepped portion is formed and where the stepped portion ends, respectively.

19. The damper according to claim 18, wherein the radii $R_1$ and $R_2$ are at least approximately 1 mm.

20. The damper according to claim 13, wherein the damping member absorbs and reduces impact energy transferred from the damping plate towards the cover member.

21. The damper according to claim 13, wherein the damping member comprises viscoelastic material.

22. The damper according to claim 21, wherein the viscoelastic material is at least one of a polymer or rubber.

23. The damper according to claim 13, further comprising a stepped surface of the cover member, wherein the damping member is provided on the stepped surface of the cover member.

24. The damper according to claim 13, wherein double sided adhesive tape allows the damping member to be attached to the cover member and to the damping plate.

* * * * *